US011355777B2

(12) United States Patent
Ito et al.

(10) Patent No.: US 11,355,777 B2
(45) Date of Patent: Jun. 7, 2022

(54) BATTERY MANUFACTURING APPARATUS

(71) Applicant: MURATA MANUFACTURING CO., LTD., Kyoto (JP)

(72) Inventors: Takahiro Ito, Kyoto (JP); Hiromitsu Fukaya, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 233 days.

(21) Appl. No.: 16/700,617

(22) Filed: Dec. 2, 2019

(65) Prior Publication Data
US 2020/0106120 A1 Apr. 2, 2020

Related U.S. Application Data

(63) Continuation of application No. PCT/JP2018/017771, filed on May 8, 2018.

(30) Foreign Application Priority Data

Jun. 2, 2017 (JP) .............................. JP2017-110254

(51) Int. Cl.
*H01M 10/04* (2006.01)
*H01M 10/44* (2006.01)

(52) U.S. Cl.
CPC ... *H01M 10/0468* (2013.01); *H01M 10/0404* (2013.01); *H01M 10/44* (2013.01)

(58) Field of Classification Search
CPC ......... H01M 10/0468; H01M 10/0404; H01M 10/0409
See application file for complete search history.

(56) References Cited

U.S. PATENT DOCUMENTS

2017/0098855 A1* 4/2017 Karditsas .............. H01M 50/20
2018/0183088 A1* 6/2018 Kim .................. H01M 10/0404

FOREIGN PATENT DOCUMENTS

| CN | 203326043 U | 12/2013 |
| CN | 205004402 | 1/2016 |
| JP | 2001-035523 A | 2/2001 |
| JP | 2003-157903 A | 5/2003 |
| JP | 2013-206689 A | 10/2013 |
| JP | 2016-100276 A | 5/2016 |

OTHER PUBLICATIONS

JP2013206689A—Machine Translation (Year: 2013).*
International Search Report and Written Opinion issued in connection with International Patent Application No. PCT/JP2018/017771, dated Jun. 12, 2018. (6 pages).
Chinese Office Action dated Apr. 2, 2022 in corresponding Chinese Application No. 201880028930.4.

* cited by examiner

*Primary Examiner* — Brian R Ohara
*Assistant Examiner* — Patrick Marshall Greene
(74) *Attorney, Agent, or Firm* — K&L Gates LLP

(57) ABSTRACT

A battery manufacturing apparatus includes two or more pressing portions that sandwich a flat battery therebetween and press the battery, a placing portion that is provided between the pressing portions and on which the battery is placed so that a main surface of the battery faces the pressing portion, and a driving unit that moves the pressing portions in directions toward or away from each other. The placing portion is configured to be capable of expanding and contracting as the pressing portion moves.

12 Claims, 14 Drawing Sheets

BATTERY MANUFACTURING APPARATUS

CROSS REFERENCE TO RELATED APPLICATIONS

The present application is a continuation of PCT patent application no. PCT/JP2018/017771, filed on May 8, 2018, which claims priority to Japanese patent application no. JP2017-110254 filed on Jun. 2, 2017, the entire contents of which are being incorporated herein by reference.

BACKGROUND

The present disclosure generally relates to a battery manufacturing apparatus.

In recent years, a reduction in size and weight of mobile devices such as mobile phones and personal digital assistants (PDAs) has remarkably improved. As a result, a battery used for a power source for these devices is required to be thinner and lighter. In order to meet this requirement, a laminate film type battery in which a flat electrode body is accommodated in a film-shaped exterior material has been proposed.

As a method for manufacturing the battery described above, a method has been proposed that includes a step of, after accommodating a flat electrode body in a film-shaped exterior material to form a laminate film type battery, pressing the battery in a thickness direction thereof.

SUMMARY

The present disclosure generally relates to a battery manufacturing apparatus.

An object of the present disclosure is to provide a battery manufacturing apparatus that facilitates positioning of a battery with respect to a pressing portion.

According to an embodiment of the present disclosure, a battery manufacturing apparatus is provided. The battery manufacturing apparatus includes two or more pressing portions configured to sandwich a flat battery therebetween and to press the battery, a placing portion provided between the pressing portions, wherein the battery is placed on the placing portion so that a main surface of the battery faces at least one of the pressing portions, and a driver configured to move the pressing portions in directions toward or away from each other. The placing portion is configured to expand and contract while the pressing portions move.

According to the present disclosure, a battery can be easily positioned with respect to a pressing portion. It should be understood that the effects described herein are not necessarily limited, and may be any effect or an effect different from those described in the present disclosure.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
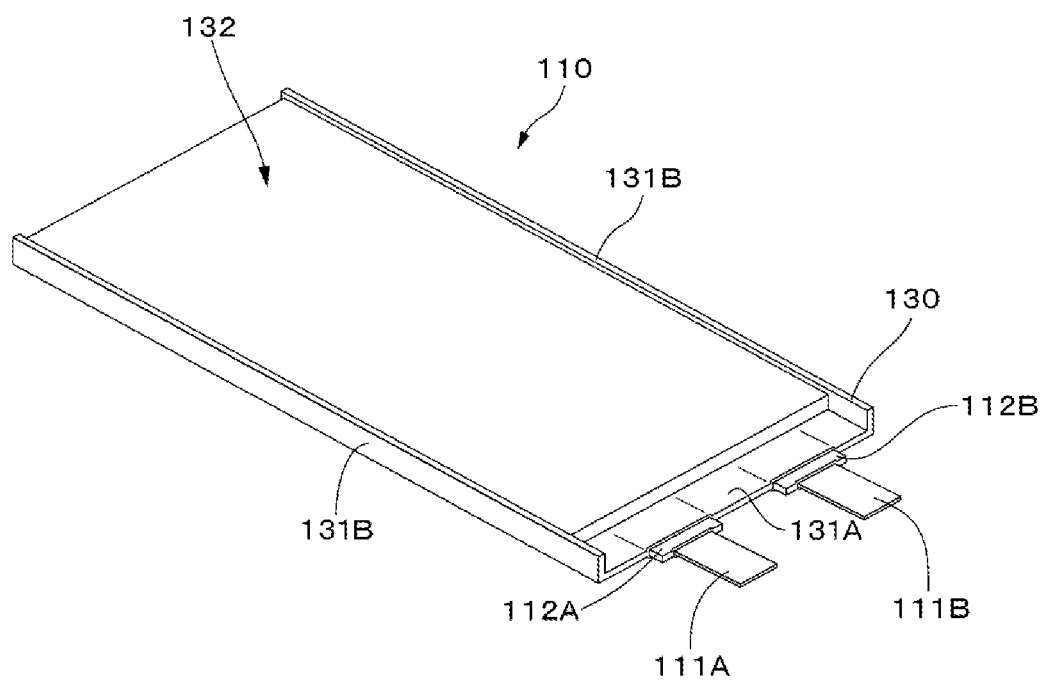
FIG. 1 is a perspective view showing an appearance of a laminate film type battery according to an embodiment of the present disclosure.
Figure 2:
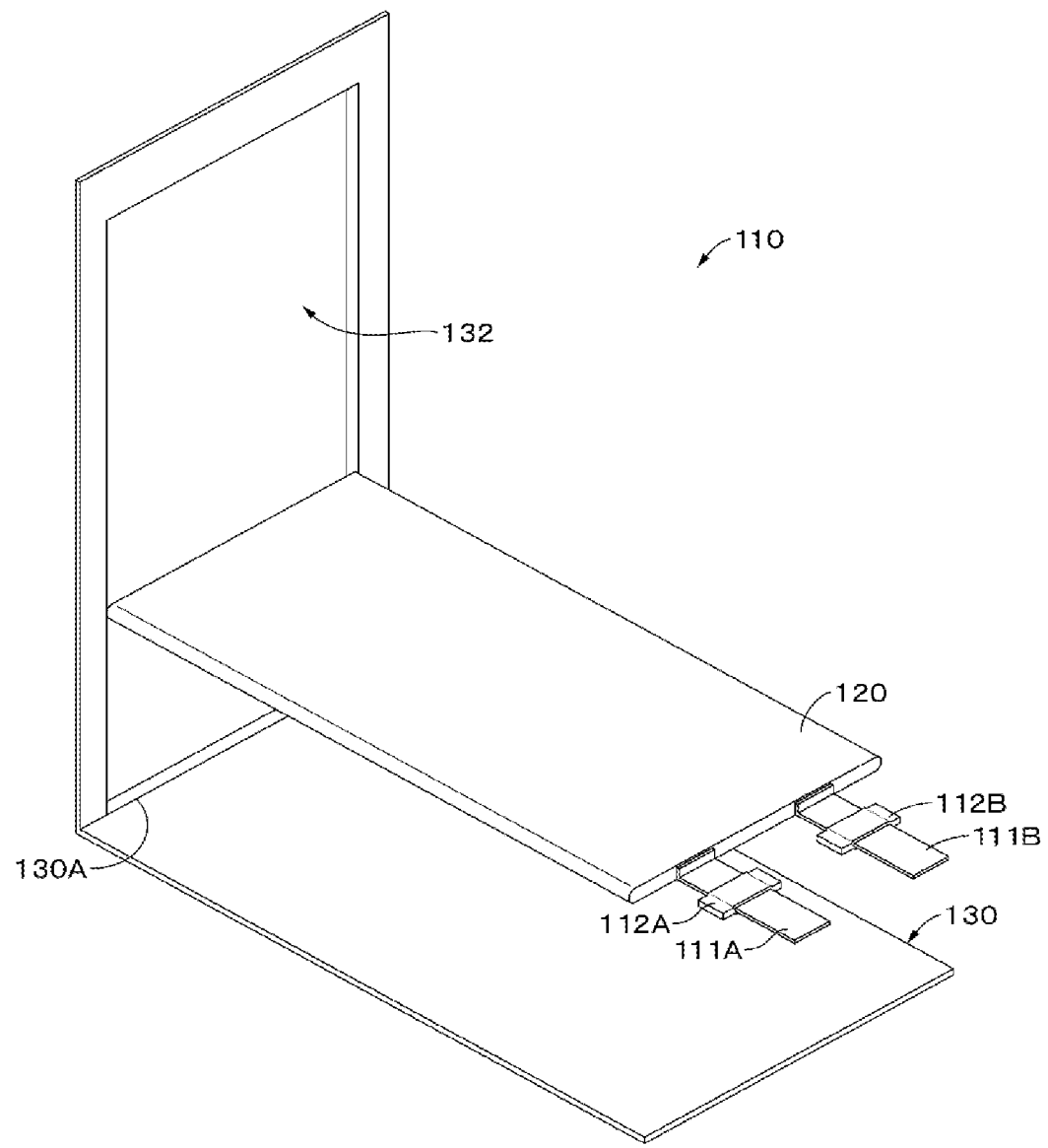
FIG. 2 is an exploded perspective view showing a configuration of the laminate film type battery according to an embodiment of the present disclosure.

First, a configuration of a laminate film type battery (hereinafter simply referred to as "battery") 110 will be described with reference to FIGS. 1 and 2. The battery 110 includes a flat electrode body 120 to which a positive electrode lead 111A and a negative electrode lead 111B are attached, and a film-shaped exterior material 130 that accommodates the electrode body 120. When the battery 110 is viewed in a plan view from a direction perpendicular to a main surface thereof, the battery 110 has a rectangular shape. The battery 110 is, for example, a lithium ion secondary battery or a lithium ion polymer secondary battery. However, the battery 110 is not limited to the batteries described above, and may be a secondary battery other than the batteries described above, or a primary battery. The battery 110 may also be an all-solid battery such as an all-solid lithium ion secondary battery.

The positive electrode lead 111A and the negative electrode lead 111B are led out from one short-hand side of the battery 110 in the same direction. Hereinafter, the short-hand side of the electrode body 120 from which the positive electrode lead 111A and the negative electrode lead 111B are led out is referred to as a top side, and the opposite short-hand side thereto is referred to as a bottom side. Further, a longitudinal side of the battery 110 is referred to as a lateral side.

The positive electrode lead 111A and the negative electrode lead 111B each have, for example, a thin plate shape or a net-like appearance. The positive electrode lead 111A and the negative electrode lead 111B each contain a metal material such as aluminum (Al), copper (Cu), nickel (Ni), or stainless steel.

Adhesive films 112A and 112B for preventing intrusion of outside air are inserted between the exterior material 130 and the positive electrode lead 111A and between the exterior material 130 and the negative electrode lead 111B, respectively. The adhesive films 112A and 112B each contain a material having adhesion to the positive electrode lead 111A and the negative electrode lead 111B, for example, a polyolefin resin such as polyethylene, polypropylene, modified polyethylene, or modified polypropylene.

The exterior material 130 has a rectangular shape, and is folded back at a central portion 130A in a longitudinal direction of the exterior material 130, so that each side overlaps. A cut or the like may be provided in advance in the central portion 130A that serves as a folded portion. The electrode body 120 is sandwiched between the folded portions of the exterior material 130. A seal portion 131A is formed on the top side of a periphery of the folded exterior material 130, and seal portions 131B are formed on both of the lateral sides. The exterior material 130 has an accommodating portion 132 for accommodating the electrode body 120 on one surface to be overlaid. The accommodating portion 132 is formed by deep drawing, for example. The seal portions 131B are bent so as to sandwich the accommodating portion 132 therebetween. However, the seal portion 131B may not be bent.

The exterior material 130 includes, for example, a rectangular laminate film having flexibility. The exterior material 130 includes a metal layer, a first resin layer provided on one surface (first surface) of the metal layer, and a second resin layer provided on the other surface (second surface) of the metal layer. The exterior material 130 may further include an adhesive layer in at least one of an area between the metal layer and the first resin layer and an area between the metal layer and the second resin layer as necessary. Note that a surface on a side of the first resin layer of both surfaces of the exterior material 130 serves as an outer surface, and a surface on a side of the second resin layer serves as an inner surface that accommodates the electrode body 120.

The metal layer is a barrier layer for suppressing an entry of moisture and the like and protecting the electrode body 120 that is a stored. The metal layer is a metal foil, and contains, for example, aluminum or an aluminum alloy.

The first resin layer is a surface protective layer that has a function of protecting a surface of the exterior material 130. The first resin layer contains, for example, at least one of nylon (Ny), polyethylene terephthalate (PET), and polyethylene naphthalate (PEN).

The second resin layer is a heat-sealing resin layer for sealing peripheral edges of the inner surface of the folded exterior material 130 by heat-sealing. The second resin layer contains, for example, at least one of polypropylene (PP) and polyethylene (PE).

However, the exterior material 130 may include, instead of the laminate film described above, a laminate film having another configuration, a polymer film such as polypropylene, or a metal film. Alternatively, the exterior material 130 may also include a laminate film in which, with an aluminum film serving as a core material, polymer films are stacked on one surface or both surfaces of the aluminum film.

Moreover, the exterior material 130 may further include a colored layer from the viewpoint of beautiful appearance, and may also include a colorant in at least one of the first and second resin layers. When the exterior material 130 further includes an adhesive layer in at least one of the area between the metal layer and the first resin layer and the area between the metal layer and the second resin layer, the adhesive layer may include the colorant.

The electrode body 120 is a wound electrode body in which long positive and negative electrodes are stacked with a long separator interposed therebetween, and are wound in a flat and spiral shape. The electrode body 120 is impregnated with an electrolytic solution.

However, a configuration of the electrode body 120 is not limited to a wound type, and the electrode body 120 may be a stacked electrode body (stacked electrode body) in which a positive electrode and a negative electrode are stacked with a separator interposed therebetween. Alternatively, the electrode body 120 may be an electrode body that has a configuration in which a positive electrode and a negative electrode with a separator interposed therebetween are folded.

Further, an electrolyte is not limited to the electrolytic solution, and the electrode body 120 may include an electrolyte layer that includes an electrolytic solution and a polymer compound that serves as a holding body for holding the electrolytic solution, between the positive electrode and the separator and between the negative electrode and the separator. In this case, the electrolyte layer may be in a gel form. Further, the electrode body 120 may include a solid electrolyte layer between the positive electrode and the negative electrode.

Figure 3:
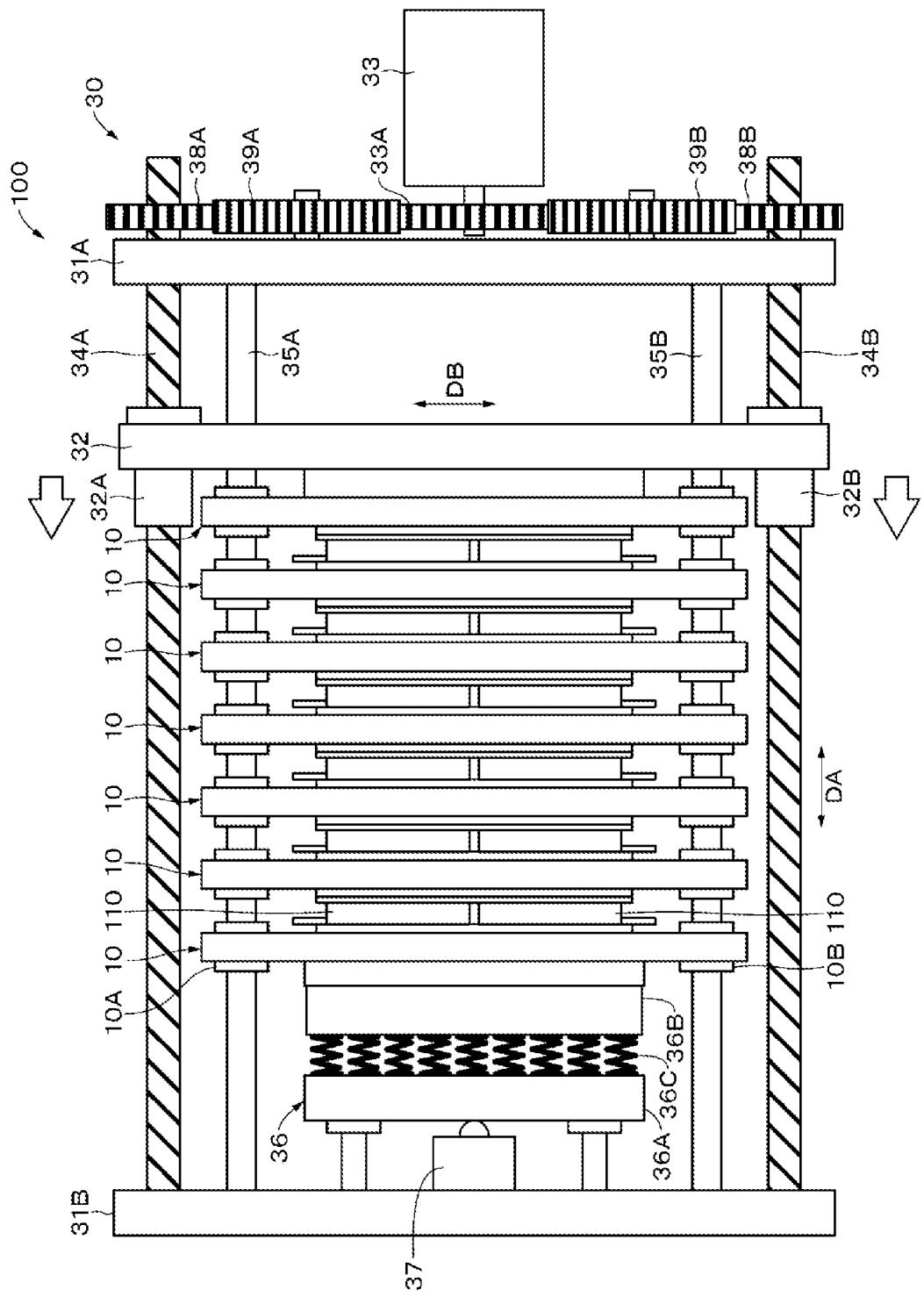
FIG. 3 is a top view showing a configuration of a battery manufacturing apparatus according to an embodiment of the present disclosure.

Next, the configuration of a battery manufacturing apparatus 100 according to an embodiment of the present disclosure will be described with reference to FIGS. 3 to 9. As shown in FIG. 3, the battery manufacturing apparatus 100 includes a plurality of pressing plates (pressing portions) 10 that sandwich a flat battery 110 therebetween and press the battery 110, a plurality of placing portions 20 that are provided between the pressing plates 10 and on which the battery 110 is placed so that a main surface of the battery 110 faces the pressing plate 10, a driving unit 30 (driver) that relatively moves the pressing plates 10 in directions toward or away from each other, and a plurality of raising and lowering portions 40 that raises or lowers the placing portion 20.

It should be understood that, although not shown, the battery manufacturing apparatus 100 is provided with a charging device for charging the battery 110 and a control device for controlling the battery manufacturing apparatus 100. However, the battery manufacturing apparatus 100 may include a charging device.

The pressing plate 10 is configured to be capable of heating the battery 110. The pressing plate 10 includes a plate body 11, a heater (heating unit) 12 provided on one surface of the plate body 11, an elastic layer 13 that covers the heater 12, and an elastic layer 14 provided on the other surface of the plate body 11. The plurality of pressing plates 10 is supported by guide shafts 35A and 35B so that the one surface on which the elastic layer 13 is provided and the other surface on which the elastic layer 14 is provided face each other.

A sheet-type or plate-type heater, for example, is used for the heater 12. The elastic layers 13 and 14 contain a rubber-based resin. The rubber-based resin includes at least one of silicone rubber, natural rubber, synthetic natural rubber (isoprene rubber), butadiene rubber, styrene-butadiene rubber, butyl rubber, nitrile rubber, ethylene-propylene rubber, chloroprene rubber, acrylic rubber, chlorosulfonated polyethylene rubber, urethane rubber, fluororubber, ethylene-vinyl acetate rubber, epichlorohydrin rubber, and polysulfide rubber.

Figure 4:
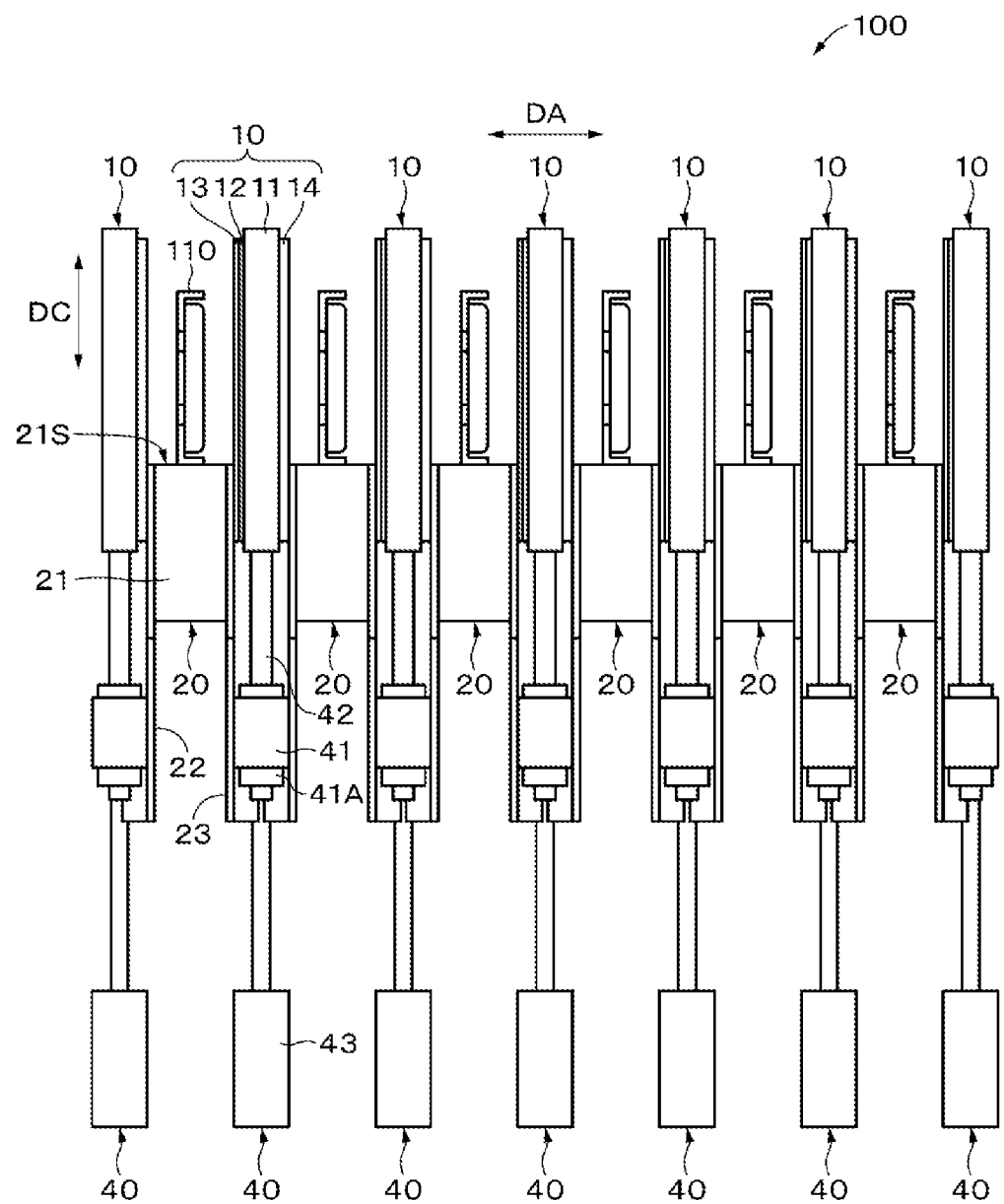
FIG. 4 is a side view showing the configuration of the battery manufacturing apparatus according to an embodiment of the present disclosure.
Figure 5:
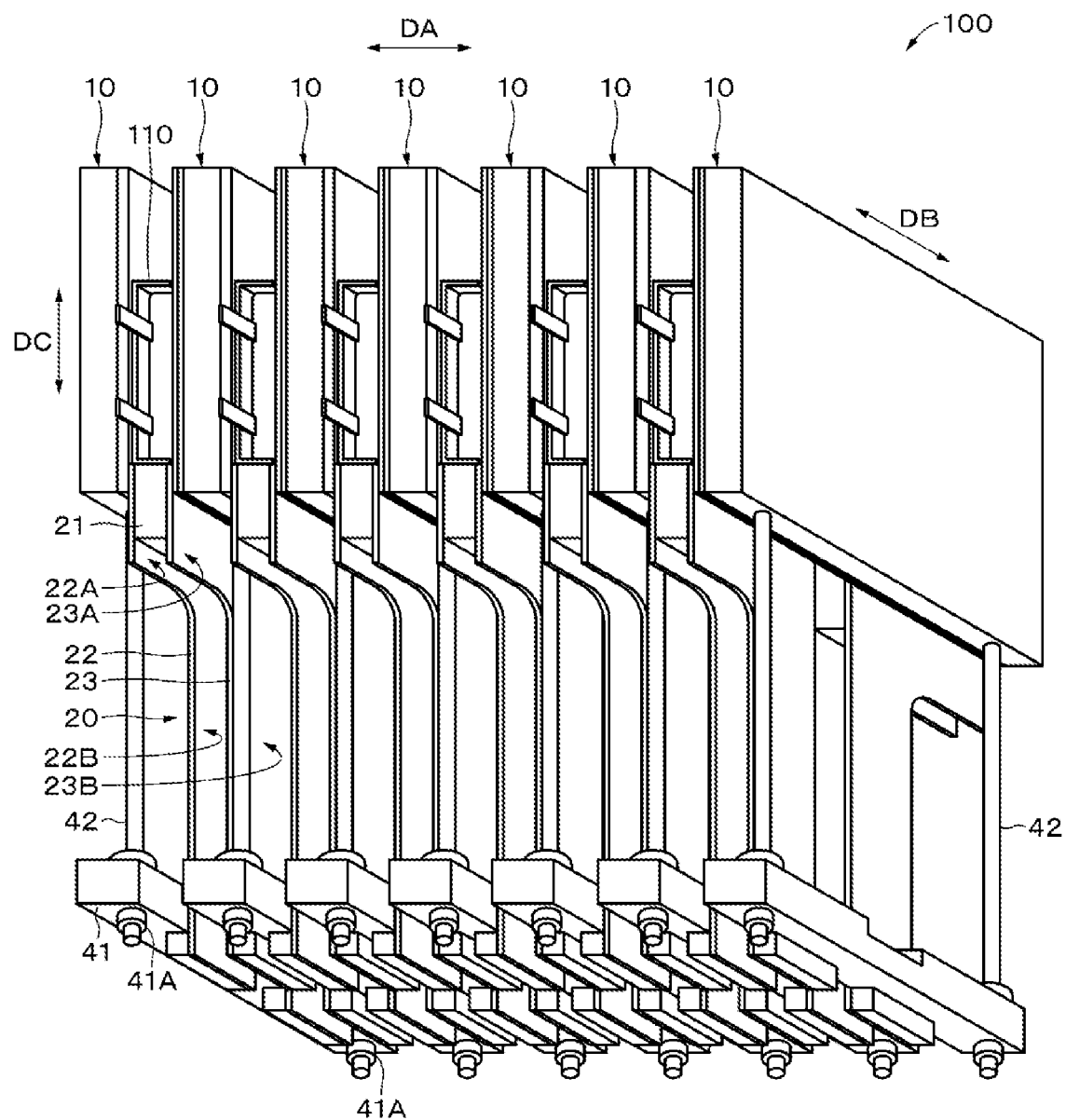
FIG. 5 is a perspective view showing the configuration of the battery manufacturing apparatus according to an embodiment of the present disclosure.
Figure 6:
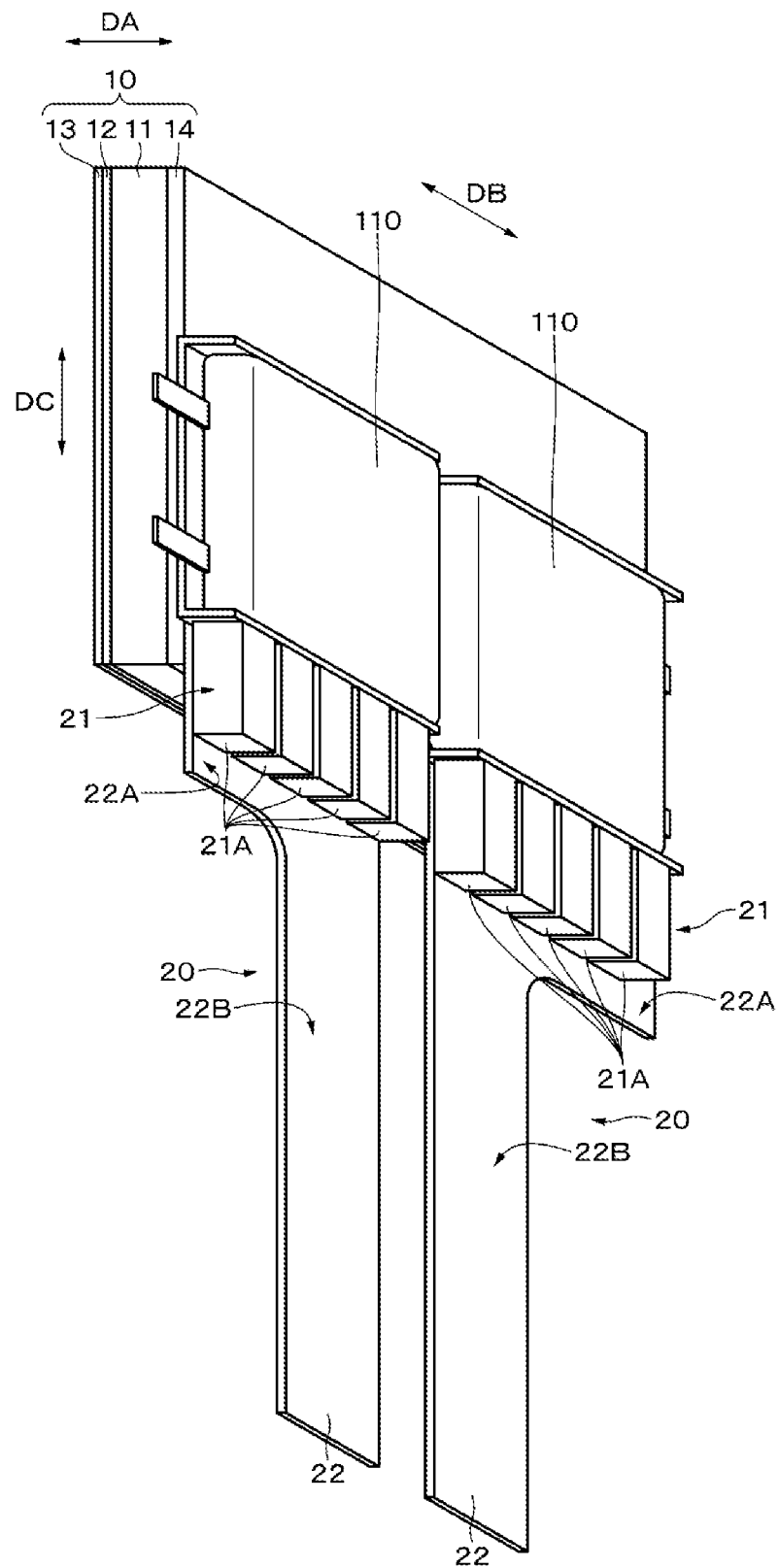
FIG. 6 is a perspective view showing a placing portion on which the laminate film type battery is placed according to an embodiment of the present disclosure.

The placing portion 20 is configured to be expandable as the pressing plate 10 moves. As shown in FIGS. 4 to 6, the placing portion 20 includes a honeycomb structure 21 and a pair of plate-like supporting portions 22 and 23 that support the honeycomb structure 21 so as to sandwich the honeycomb structure 21 therebetween. The honeycomb structure 21 has a flat placing surface 21S on which a side surface of the battery 110 is placed. Note that a surface on a bottom side of the battery 110 may be placed on the placing surface 21S. Further, the placing surface 21S may be curved or uneven.

Figure 7A:
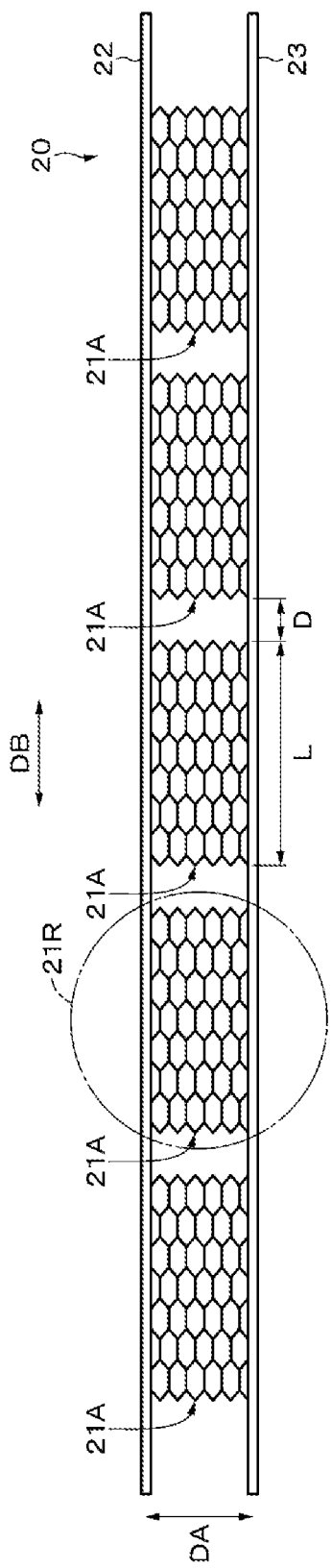
FIG. 7A is a top view showing a configuration of the placing portion according to an embodiment of the present disclosure.
Figure 7B:
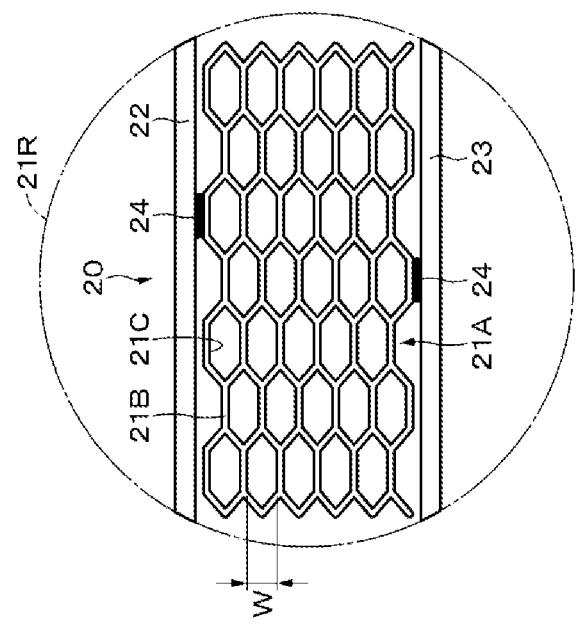
FIG. 7B is an enlarged top view showing a region 21R in FIG. 7A.

The honeycomb structure 21 includes, for example, paper, a metal sheet (for example, an aluminum sheet), a plastic sheet, or a laminate of two or more of those described above. As shown in FIG. 7B, the honeycomb structure 21 includes a plurality of cells (small chambers) 21C partitioned from each other by partition walls 21B. The plurality of cells 21C included in the honeycomb structure 21 penetrates the honeycomb structure 21 in a direction perpendicular to the placing surface 21S, that is, in a raising and lowering direction of the placing portion 20. A cross-sectional shape of the cell 21C in a direction perpendicular to a penetrating direction DC is a hexagonal shape or a substantially hexagonal shape.

A size W of the cell 21C is preferably 1 mm or more and 6 mm or less. When the size W of the cell 21C is less than 1 mm, expansion and contraction of a block 21A may be difficult. That is, the block 21A may have a high rigidity, thereby being difficult to deform. On the other hand, when the size W of the cell 21C exceeds 6 mm, an edge of the battery 110 may enter the cell 21C and get caught. Here, the size W of the cell 21C refers to a width of the cell 21C in a moving direction DA of the pressing plate 10 (that is, an expanding and contracting direction of the honeycomb structure 21) when the honeycomb structure 21 is expanded (that is, when the battery 110 is placed).

The plurality of cells 21C is configured to be deformable as the pressing plate 10 moves. Specifically, the cell 21C is configured to be crushed when the adjacent pressing plates 10 approach each other, whereas the cell 21C is configured to be opened when the adjacent pressing plates 10 are separated from each other.

Figure 8:
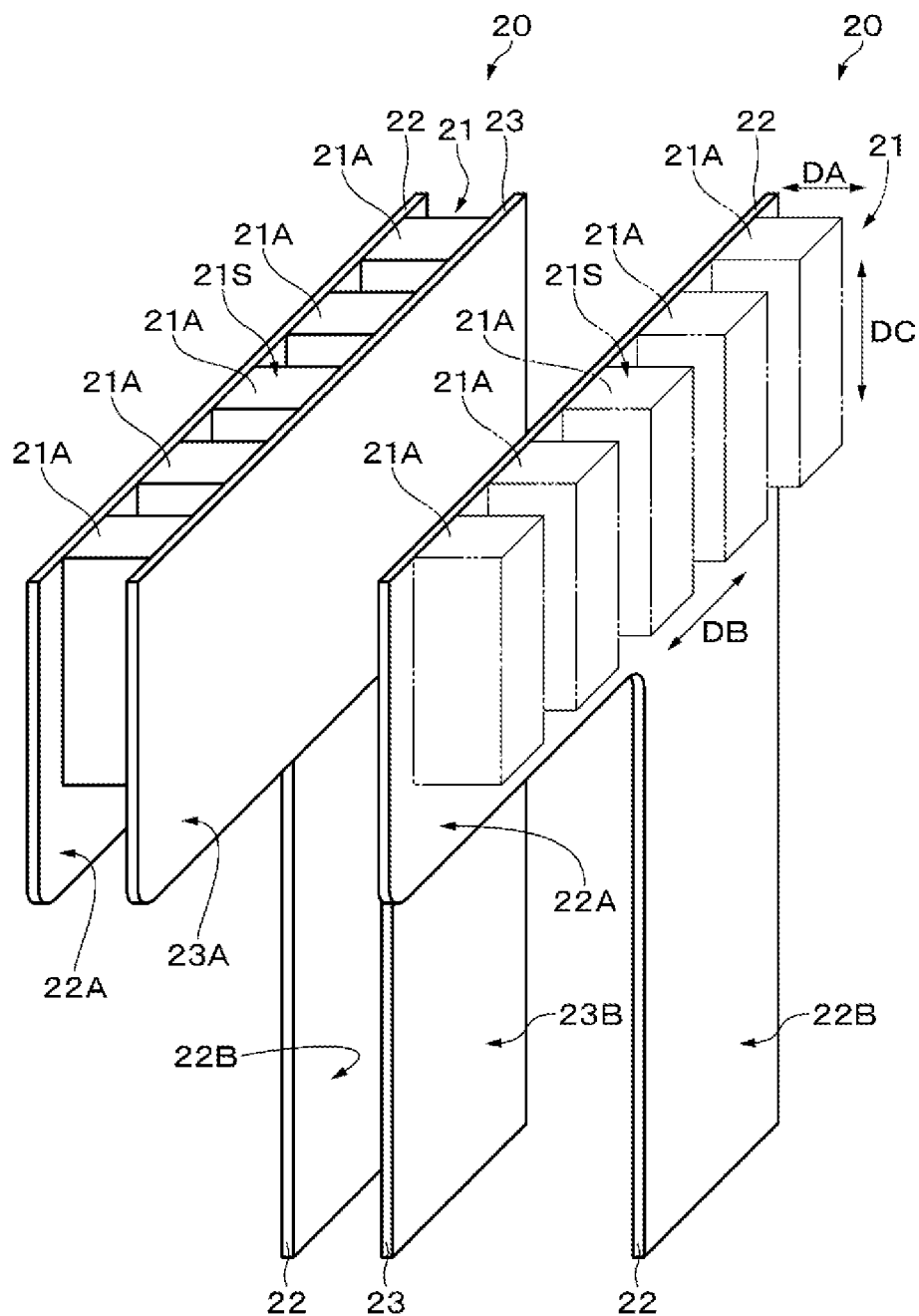
FIG. 8 is a perspective view showing the configuration of the placing portion according to an embodiment of the present disclosure.
Figure 9:
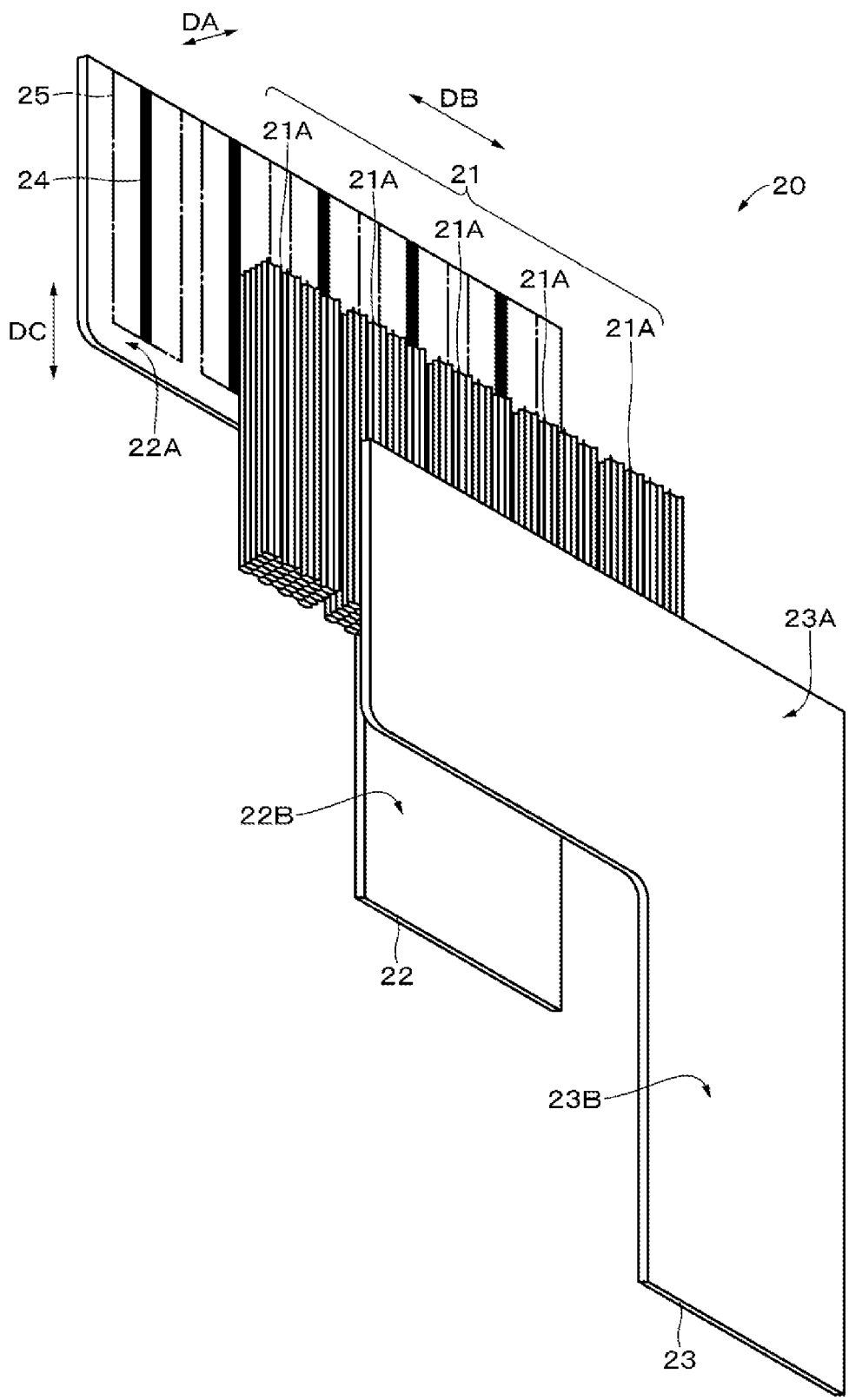
FIG. 9 is an exploded perspective view showing the configuration of the placing portion according to an embodiment of the present disclosure.

When the supporting portions 22 and 23 are viewed in a plan view from a direction perpendicular to main surfaces thereof, the supporting portions 22 and 23 each have an L shape. More specifically, as shown in FIGS. 6, 8, and 9, the supporting portions 22 and 23 include first linear portions 22A and 23A that extend in a horizontal direction with respect to the placing surface 21S, and second linear portions 22B and 23B that extend in a direction perpendicular to the first linear portions 22A and 23A, respectively. The honeycomb structure 21 is sandwiched between the first linear portions 22A and 23A.

As shown in FIGS. 6 to 9, the honeycomb structure 21 is divided into two or more blocks 21A in a direction DB (hereinafter referred to as "horizontal direction") perpendicular to both of the moving direction DA of the pressing plate 10 (that is, the expanding and contracting direction of the honeycomb structure 21) and the penetrating direction DC of the cells 21C. As shown in FIGS. 7B and 9, the block 21A and one main surface of each of the first linear portions 22A and 23A are bonded together by a single linear adhesive portion 24 parallel to the penetrating direction DC of the cell 21C. Note that, in FIG. 9, an arrangement area 25 of each of the blocks 21A is indicated by a one-dot chain line.

As described above, since the honeycomb structure 21 is divided into two or more blocks 21A and bonded by the linear adhesive portion 24, expansion and contraction of the block 21A in the horizontal direction DB can be prevented from being inhibited by bonding of the block 21A and one main surface of each of the supporting portions 22 and 23. However, the shape of the adhesive portion 24 is not limited to a linear shape, and the block 21A may be bonded with one surface of each of the supporting portions 22 and 23 by the adhesive portion 24 that has a shape of dots aligned in a direction parallel to the penetrating direction DC of the cell 21C.

The blocks 21A are separated from each other. Through separation of the blocks 21A from each other in this manner, when each of the blocks 21A is expanded in the horizontal direction DB, the adjacent blocks 21A can be prevented from being hit against each other, and thus the expansion of each block 21A in the horizontal direction DB can be prevented from being inhibited.

A width L of the block 21A in the horizontal direction DB (see FIG. 7) is preferably not less than the size of the cell 21C and not more than 30 mm, for example, not less than 1 mm and not more than 30 mm. If the width L of the block 21A exceeds 30 mm, when the battery 110 is placed on the placing surface 21S, deformation of the placing surface 21S increases, and thus the position and the shape of the placing surface 21S may not be easily maintained. Here, the width L of the block 21A in the horizontal direction DB refers to the width of the block 21A in the horizontal direction DB when the honeycomb structure 21 is expanded (that is, when the battery 110 is placed).

Assuming that the width of the block 21A in the horizontal direction DB when the honeycomb structure 21 is contracted (that is, when the battery 110 is pressed) is about 1.14 times the width L of the block 21A in the horizontal direction DB when the honeycomb structure 21 is expanded (that is, when the battery 110 is placed), a width D of a gap between the blocks 21A (see FIG. 7) is preferably equal to or greater than a value defined by the following equation (1). More specifically, the width D is preferably 0.78 mm or more and 11.4 mm or less.

$$D = (L \times 1.14 - L) \times 2 + A \quad (1)$$

Here, A represents the width of the gap between the blocks 21A when the honeycomb structure 21 is contracted (that is, when the battery 110 is pressed) (hereinafter referred to as "clearance"). The clearance is preferably in a range of 0.5 mm to 3 mm inclusive. If the clearance is too wide, the battery 110 may fall from the placing surface 21S when the battery 110 is placed on the placing surface 21S.

As shown in FIG. 3, the driving unit 30 (driver) includes first and second supporting plates 31A and 31B that are separated from each other by a predetermined interval so that main surfaces thereof face each other, and a pressing plate 32 that is provided between the first and second supporting plates 31A and 31B so that the main surfaces of the first and second supporting plates 31A and 31B and both main surfaces of the pressing plate 32 face each other. The plurality of pressing plates 10 is provided between the second supporting plate 31B and the pressing plate 32, and main surfaces of the plurality of pressing plates 10 are held so as to face the main surface of the pressing plate 32.

Further, the driving unit 30 includes a motor 33 provided on, out of both main surfaces of the first supporting plate 31A, a side of the main surface opposite to the second supporting plate 31B, driving shafts 34A and 34B, both ends of which are rotatably supported by the first and second supporting plates 31A and 31B, guide shafts 35A and 35B, both ends of which are supported by the first and second supporting plates 31A and 31B, and that guide movements of the plurality of pressing plates 10, a support 36 provided between the plurality of pressing plates 10 and the second supporting plate 31B, and a load cell 37 provided between the second supporting plate 31B and the support 36.

One end of each of the driving shafts 34A and 34B protrudes from one main surface of the first supporting plate 31A, and gears 38A and 38B are fixed to these protrusions, respectively. Moreover, a gear 33A is fixed to an output shaft of the motor 33, and gears 39A and 39B are rotatably supported on one main surface of the first supporting plate 31A. The gear 39A is provided between the gears 33A and 38A and meshed with the gears 33A and 38A. Moreover, the gear 39B is provided between the gears 33A and 38B, and meshed with the gears 33A and 38B. Thus, when the gear 33A is rotated by the motor 33, 39A and 39B meshed with the gear 33A are rotated. When the gears 39A and 39B are rotated, the gears 38A and 38B respectively meshed with the gears 39A and 39B are rotated. When the gears 38A and 38B are rotated, the driving shafts 34A and 34B to which the gears 38A and 38B are fixed respectively are rotated.

Bearings 32A and 32B are provided at peripheral edges of the pressing plate 32, and the driving shafts 34A and 34B are inserted into the bearings 32A and 32B, respectively. Moreover, spiral grooves are provided on peripheral surfaces of the driving shafts 34A and 34B, spiral grooves are similarly provided on inner peripheral surfaces (bearing surfaces) of the bearing 32A and 32B, and the spiral grooves of the driving shafts 34A and 34B mesh with the spiral grooves of the bearings 32A and 32B. Accordingly, the pressing plate 32 can move in a direction toward or away from the second supporting plate 31B as the driving shafts 34A and 34B rotate.

Linear bushes 10A and 10B are provided at peripheral edges of the pressing plate 10, and the guide shafts 35A and 35B are inserted into the linear bushes 10A and 10B, respectively. Accordingly, a movement of the pressing plate 10 in the direction toward or away from the second supporting plate 31B is guided. Note that in FIGS. 4 to 6 and the like, the linear bushes 10A and 10B are not shown.

The pressing plate 10 closest to the pressing plate 32 among the plurality of pressing plates 10 is fixed to one main surface of the pressing plate 32. Moreover, the pressing plate 10 closest to the support 36 among the plurality of pressing plates 10 is fixed to the support 36. Furthermore, as shown in FIG. 4, the placing portion 20 is sandwiched between the adjacent pressing plates 10. As a result, when the pressing plate 32 is moved in a direction away from the second supporting plate 31B, the plurality of pressing plates 10 is interlocked with the pressing plate 32 to be moved in the direction away from the second supporting plate 31B, and at the same time, to separate the adjacent pressing plates 10 from each other.

The support 36 includes two plate-like members 36A and 36B, and a plurality of springs 36C sandwiched between the plate-like members 36A and 36B, and supports the plurality of pressing plates 10 that are pressed toward the second supporting plate 31B by the pressing plate 32. The load cell 37 detects pressure applied to the support 36, and outputs a detection result to a control device, which is not shown.

As shown in FIGS. 4, 5, and 8, the raising and lowering portion 40 includes a slide base 41 provided between one ends of the second linear portions 22B and 23B of the supporting portions 22 and 23, two guide shafts 42 extending toward the slide base 41 from the pressing plate 10, and a driving unit 43 that moves the slide base 41 in a direction toward or away from the pressing plate 10. The guide shafts 42 have two linear bushes 41A, and the guide shafts 42 are passed through the linear bushes 41A. An actuator such as a linear motion motor can be used for the driving unit 43.

The slide base 41 is guided by the guide shaft 42 so as to be movable in the direction toward or away from the pressing plate 10. As the slide base 41 moves in the direction toward the pressing plate 10, the placing portion 20 (i.e. the placing surface 21S) is raised. In addition, when the slide base 41 moves in the direction away from the pressing plate 10, the placing portion 20 (i.e. the placing surface 21S) is lowered. Therefore, a position of the placing surface 21S can be adjusted by the movement of the slide base 41.

Next, an operation of the battery manufacturing apparatus 100 having the configuration described above will be described with reference to FIGS. 4, 10, and 11.

First, the driving unit 30 is driven, and as shown in FIG. 4, the adjacent pressing plates 10 are relatively moved in the direction away from each other, and the adjacent pressing plates 10 are separated by a specified distance. Here, the specified distance is a distance larger than a thickness of the battery 110 pressed by the battery manufacturing apparatus 100. Next, the raising and lowering portion 40 is driven to raise the placing portion 20, and the position of the placing surface 21S is adjusted to an initial position. At this time, the initial position of the placing surface 21S is adjusted according to a size of the battery 110 so that a center of a main surface of the battery 110 is positioned nearly at a center of a pressing surface of the pressing plate 10. Subsequently, the battery 110 is carried between the adjacent pressing plates 10 by a carrier device, which is not shown, and a side surface (surface on the lateral side) of the battery 110 is placed on the placing surface 21S so that the main surface of the battery 110 faces the pressing surface of the pressing plate 10.

Figure 10:
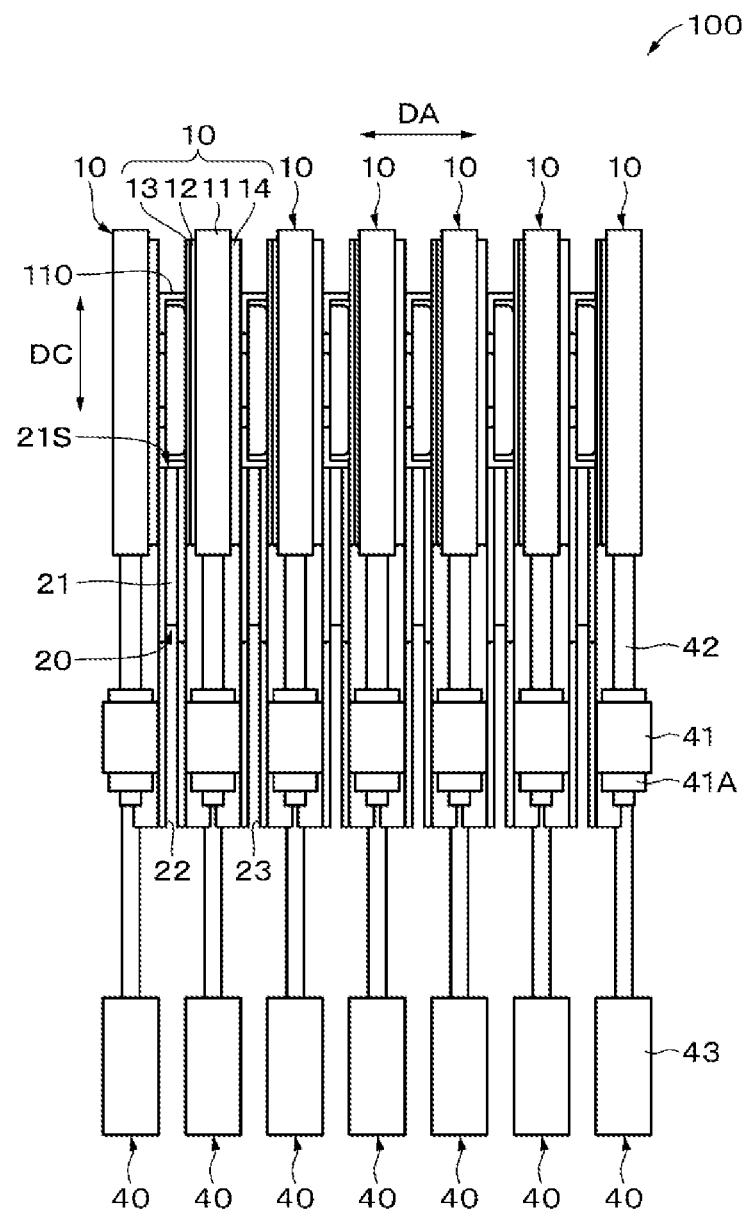
FIG. 10 is a side view for explaining an operation of the battery manufacturing apparatus according to an embodiment of the present disclosure.

Next, the driving unit 30 is driven, and as shown in FIG. 10, the adjacent pressing plates 10 are relatively moved in the direction toward each other, and the battery 110 is sandwiched between the adjacent pressing plates 10 to charge the battery 110 while pressing and heating the battery 110. In this manner, charging the battery 110 while pressing and heating the battery 110 can reduce variations in the thickness of the battery 110 and reduce internal resistance.

Figure 11:
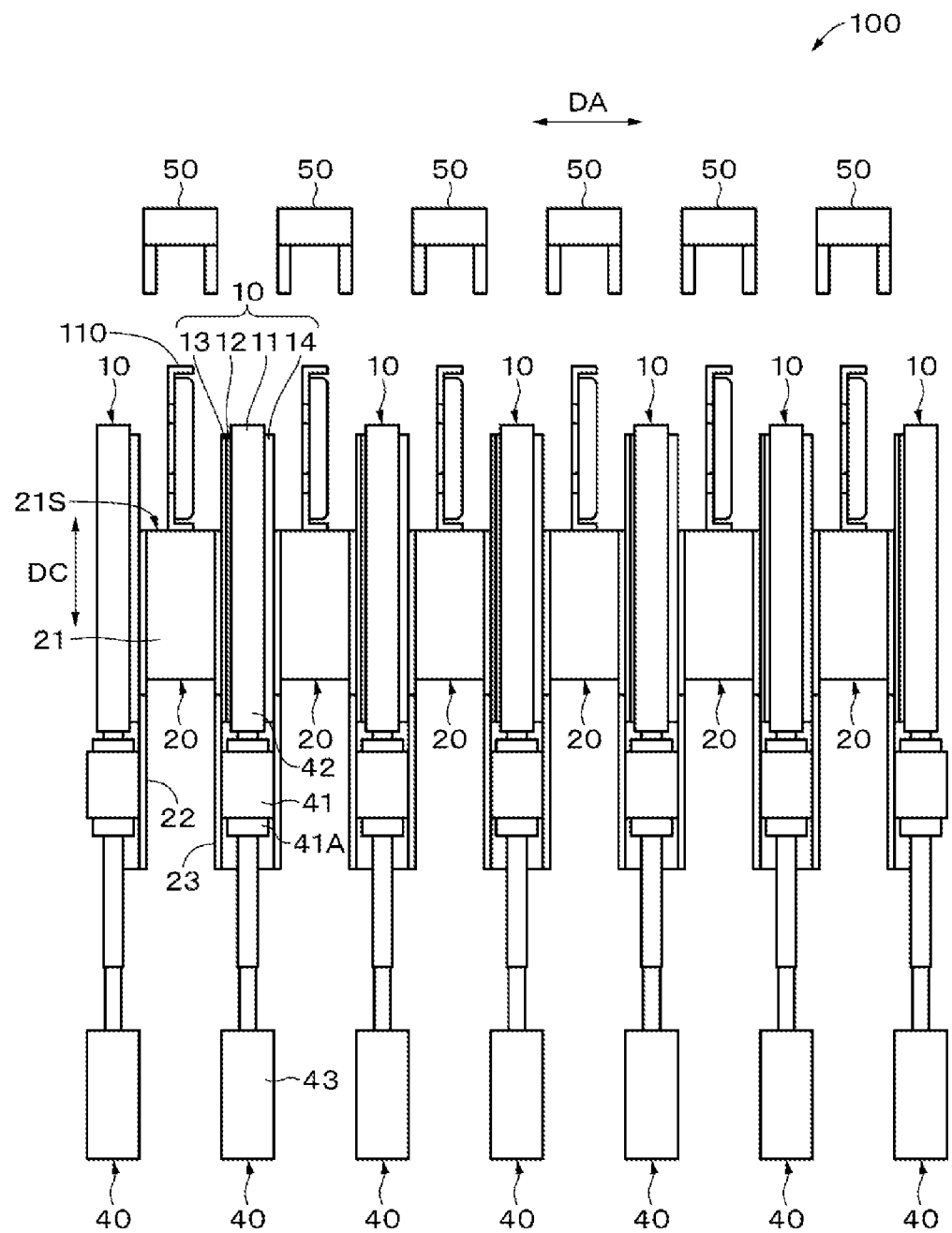
FIG. 11 is a side view for explaining the operation of the battery manufacturing apparatus according to an embodiment of the present disclosure.

Subsequently, as shown in FIG. 11, the driving unit 30 is driven, the adjacent pressing plates 10 are relatively moved in the direction away from each other, and the adjacent pressing plates 10 are separated from each other by a specified distance. Then, the raising and lowering portion 40 is driven to raise the placing portion 20, and a part (side end portion) of the battery 110 is protruded from an upper end of the pressing plate 10. Thereafter, the part of the battery 110 protruding from the upper end of the pressing plate 10 is gripped by a carrier device 50 and carried out of the battery manufacturing apparatus 100. Then, the raising and lowering portion 40 is driven to lower the placing portion 20, and the position of the placing surface 21S is returned to the initial position.

In the battery manufacturing apparatus 100 according to the embodiment described above, the position (height) of the placing surface 21S can be adjusted through moving of the placing portion 20 provided between the adjacent pressing plates 10 with the raising and lowering portion 40. Therefore, the battery 110 can be easily positioned with respect to the pressing surface of the pressing plate 10.

Figure 14:
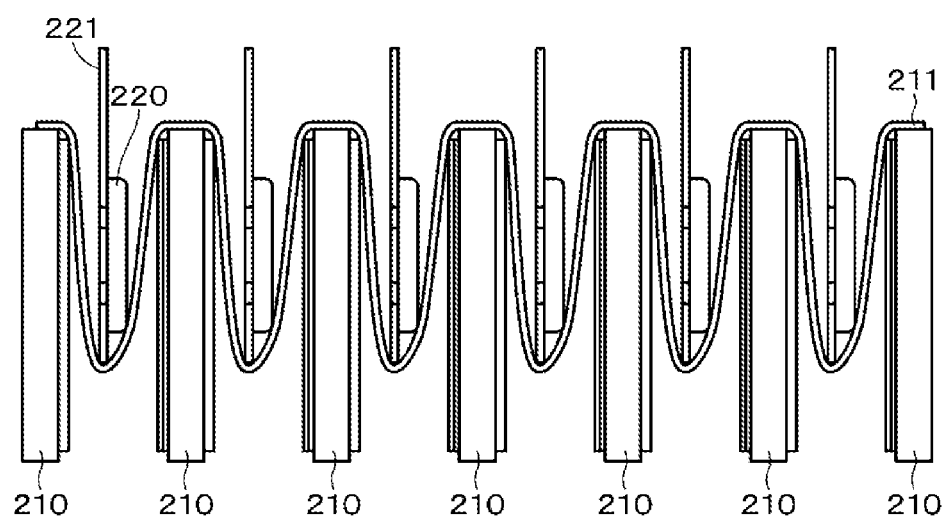
FIG. 14 is a side view showing a configuration of a battery manufacturing apparatus according to an embodiment of the present disclosure.

Further, in the battery manufacturing apparatus shown in FIG. 14, the excessive seal portion 221 of the battery 220 needs to be protruded from the upper end of the pressing plate 210. Therefore, the battery 220 needs to be positioned with respect to the pressing surface of the pressing plate 210 so that the center of a main surface of the battery 220 is shifted upward from the center of the pressing plate 210. When the battery 220 is pressed by the pressing plate 210 while the battery 220 is positioned in this manner, pressure is strongly applied to a lower side of the battery 220, whereas the pressure is only weakly applied to an upper side of the battery 220. As a result, the pressure applied to the battery 220 may not be constant. In contrast, in the battery manufacturing apparatus 100 according to the embodiment described above, the placing portion 20 is raised by the raising and lowering portion 40, and a part (side end portion) of the battery 110 is protruded from the upper end of the pressing plate 10 so that the protruding part can be gripped by the carrier device 50 and carried out. Therefore, the battery 110 can be pressed by the pressing plate 10 while the center of the main surface of the battery 110 is positioned so as to be substantially at the center of the pressing surface of the pressing plate 10. Therefore, the pressure applied to the battery 220 can be substantially constant.

Moreover, in the battery manufacturing apparatus shown in FIG. 14, every time a size of the battery 220 to be produced is changed, a complicated operation needs to be performed for re-adjusting looseness of the supporting member 211. On the other hand, in the battery manufacturing apparatus 100 according to the embodiment described above, since the placing portion 20 may be moved by the raising and lowering portion 40 to adjust the position of the placing surface 21S, a case where the size of the battery 110 to be produced is changed can be easily dealt with.

Further, in the battery manufacturing apparatus shown in FIG. 14, the batteries 220 different in size cannot be easily produced in a mixed manner, whereas in the battery manufacturing apparatus 100 according to the embodiment described above, the batteries 110 different in size can be produced in a mixed manner.

In the embodiment described above, a case has been described where the battery 110 is pressed and heated through use of the battery manufacturing apparatus 100 after the battery 110 is manufactured. However, the use of the battery manufacturing apparatus 100 is not limited thereto. The battery manufacturing apparatus 100 may be used in a battery manufacturing process such as a heat press process.

In the embodiment described above, a case has been described where the pressing plate 10 includes the heater 12 and is configured to heat the battery 110. However, the pressing plate 10 does not have to include the heater 12.

Figure 12A:
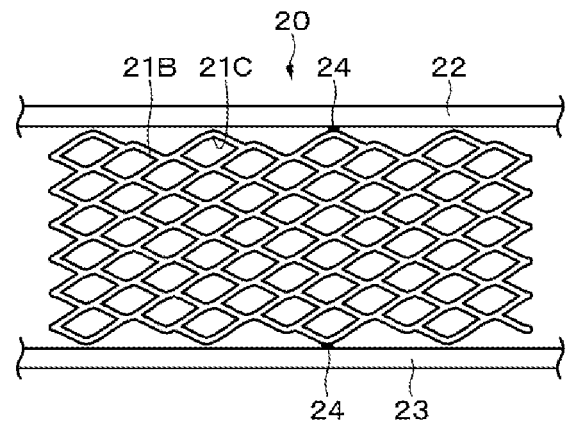
FIGS. 12A, 12B, and 12C are top views each showing an example of a porous body according to an embodiment of the present disclosure.
Figure 12B:
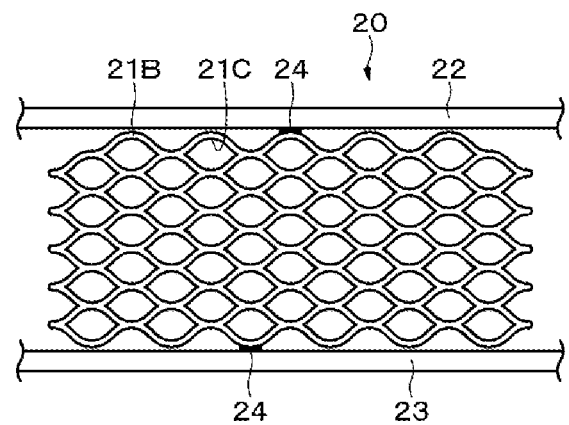
Figure 12C:
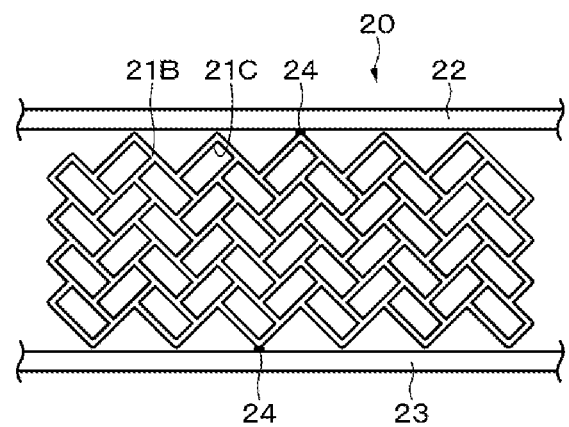

In the embodiment described above, a case has been described where the placing portion 20 includes the honeycomb structure 21 as a porous body. However, a porous body other than the honeycomb structure 21 may be provided. For example, the cross-sectional shape of the cell 21C in a direction perpendicular to the penetrating direction DC may be a substantially parallelogram shape (see FIG. 12A), a substantially rhombus shape (see FIG. 12B), or a bias shape (see FIG. 12C).

Figure 13:
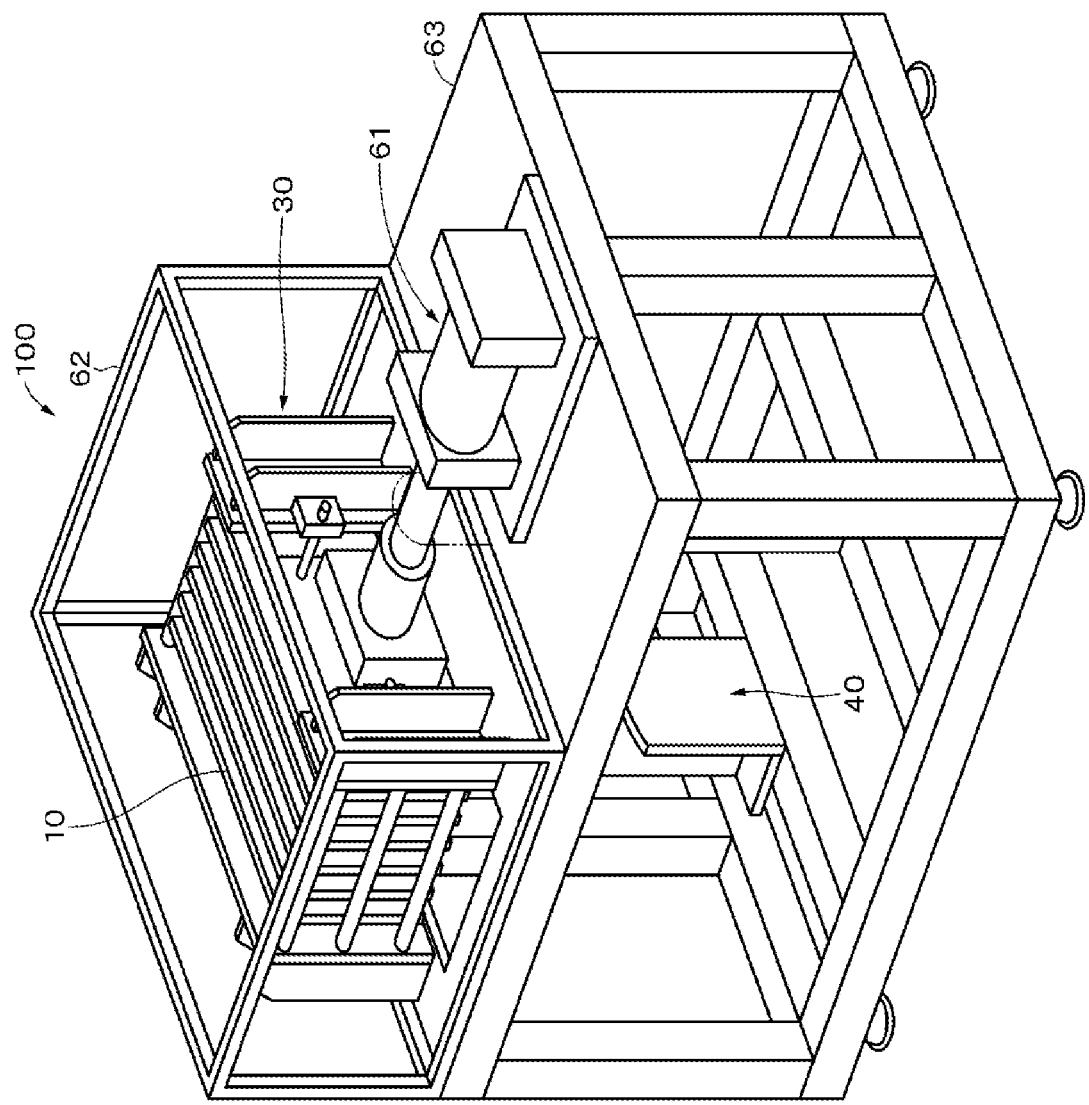
FIG. 13 is a perspective view showing a configuration of a battery manufacturing apparatus according to an embodiment of the present disclosure.

As shown in FIG. 13, the manufacturing apparatus 100 may include an air cylinder for press 61 instead of the motor 33. Moreover, the plurality of pressing plates 10 and the driving unit 30 may be covered with a transparent safety cover 62. Note that although not shown in the embodiment described above, the plurality of pressing plates 10 and the driving unit 30 are provided on a base 63.

The honeycomb structure 21 does not have to be divided into the plurality of blocks 21A. However, from the viewpoint of easy expansion and contraction of the honeycomb structure 21 in the horizontal direction, the honeycomb structure 21 is preferably divided into the plurality of blocks 21A as in the embodiment described above.

In the embodiment described above, an example has been described in which one battery 110 is placed on one placing portion 20. However, two or more batteries 110 may be placed on one placing portion 20. However, the number of the batteries 110 placed on one placing portion 20 is preferably one or more and ten or less from the viewpoint of maintaining the position and shape of the placing surface 21S.

Although the embodiment of the present disclosure has been specifically described thus far, the present disclosure is not limited to the embodiment described above, and various modifications based on the technical idea of the present disclosure are possible.

For example, the configurations, methods, processes, shapes, materials, numerical values, and the like given in the embodiment described above are merely examples, and different configurations, methods, processes, shapes, materials, numerical values, and the like therefrom may be used as necessary.

Further, the configurations, methods, processes, shapes, materials, numerical values, and the like of the embodiment described above can be combined with each other without departing from the purpose of the present disclosure.

Further, the present disclosure is described below in further detail according to an embodiment.

(1)

A battery manufacturing apparatus including:

two or more pressing portions that sandwich a battery having a flat shape between the pressing portions and press the battery;

a placing portion that is provided between the pressing portions and on which the battery is placed in such a manner that a main surface of the battery faces the pressing portion; and a driving unit that moves the pressing portions in directions toward or away from each other, in which the placing portion is configured to be capable of expanding and contracting as the pressing portion moves.

(2)

The battery manufacturing apparatus according to (1), further including a raising and lowering portion that raises or lowers the placing portion.

(3)

The battery manufacturing apparatus according to (1) or (2), in which the placing portion includes a honeycomb structure including a placing surface on which the battery is placed, and a plurality of cells included in the honeycomb structure penetrates the honeycomb structure in a direction perpendicular to the placing surface.

(4)

The battery manufacturing apparatus according to (3), in which the honeycomb structure is divided into two or more blocks in a direction perpendicular to both a moving direction of the pressing portion and a penetrating direction of the cell.

(5)
The battery manufacturing apparatus according to (4), in which
the blocks are separated from each other.
(6)
The battery manufacturing apparatus according to (5), in which
a width of the block in the direction perpendicular to both the moving direction of the pressing portion and the penetrating direction of the cell is 1 mm or more and 30 mm or less,
a width of a gap between the blocks is 0.78 mm or more and 11.4 mm or less, and
a size of the cell is 1 mm or more and 6 mm or less.
(7)
The battery manufacturing apparatus according to any one of (4) to (6), in which
the placing portion further includes a pair of supporting portions that support the honeycomb structure so as to sandwich the honeycomb structure between the supporting portions, and
the block and the supporting portion are bonded together by a linear adhesive portion parallel to the penetrating direction of the cell or an adhesive portion that has a shape of dots aligned in a direction parallel to the penetrating direction of the cell.
(8)
The battery manufacturing apparatus according to any one of (3) to (7), in which
the plurality of cells is configured to be deformable as the pressing portion moves.
(9)
The battery manufacturing apparatus according to any one of (3) to (8), in which
the honeycomb structure includes paper, a metal sheet, a plastic sheet, or a laminate of two or more of the paper, the metal sheet, and the plastic sheet.
(10)
The battery manufacturing apparatus according to (2), in which
the placing portion includes a honeycomb structure, and
a plurality of cells included in the honeycomb structure penetrates the honeycomb structure in a raising and lowering direction of the placing portion.
(11)
The battery manufacturing apparatus according to (1) or (2), in which
the placing portion includes a porous body having:
a placing surface on which the battery is placed; and
a plurality of cells partitioned from each other by partition walls, and
the plurality of cells penetrates the porous body in a direction perpendicular to the placing surface.
(12)
The battery manufacturing apparatus according to any one of (1) to (11), in which
the pressing portion is configured to be capable of heating the battery.
(13)
The battery manufacturing apparatus according to any one of (1) to (12), further including a charging device that charges the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery manufacturing apparatus comprising:
two or more pressing portions configured to sandwich a battery having a flat shape between the pressing portions and to press the battery;
a placing portion provided between the pressing portions, wherein the battery is placed on the placing portion in such a manner that a main surface of the battery faces at least one of the pressing portions;
a driver configured to move the pressing portions in directions toward or away from each other; and
a raising and lowering portion configured to raise or lower the placing portion,
wherein the placing portion is configured to expand and contract while the pressing portions move.

2. The battery manufacturing apparatus according to claim 1, wherein
the placing portion includes a honeycomb structure including a placing surface on which the battery is placed, and
a plurality of cells penetrates the honeycomb structure in a direction perpendicular to the placing surface.

3. The battery manufacturing apparatus according to claim 2, wherein
the honeycomb structure is divided into two or more blocks in a direction perpendicular to both a moving direction of the pressing portions and a penetrating direction of the cells.

4. The battery manufacturing apparatus according to claim 3, wherein the blocks are separated from each other.

5. A battery manufacturing apparatus comprising:
two or more pressing portions configured to sandwich a battery having a flat shape between the pressing portions and to press the battery;
a placing portion provided between the pressing portions, wherein the battery is placed on the placing portion in such a manner that a main surface of the battery faces at least one of the pressing portions; and
a driver configured to move the pressing portions in directions toward or away from each other,
wherein the placing portion is configured to expand and contract while the pressing portions move,
wherein the placing portion includes a honeycomb structure including a placing surface on which the battery is placed, and
a plurality of cells penetrates the honeycomb structure in a direction perpendicular to the placing surface,
wherein the honeycomb structure is divided into two or more blocks in a direction perpendicular to both a moving direction of the pressing portions and a penetrating direction of the cells,
wherein the blocks are separated from each other, and
wherein a width of the blocks in the direction perpendicular to both the moving direction of the pressing portions and the penetrating direction of the cell is from 1 mm to 30 mm,
a width of a gap between the blocks is from 0.78 mm to 11.4 mm, and
a size of the cells is from 1 mm to 6 mm.

6. A battery manufacturing apparatus comprising:
two or more pressing portions configured to sandwich a battery having a flat shape between the pressing portions and to press the battery;

a placing portion provided between the pressing portions, wherein the battery is placed on the placing portion in such a manner that a main surface of the battery faces at least one of the pressing portions; and a driver configured to move the pressing portions in directions toward or away from each other, wherein the placing portion is configured to expand and contract while the pressing portions move, wherein the placing portion includes a honeycomb structure including a placing surface on which the battery is placed, and a plurality of cells penetrates the honeycomb structure in a direction perpendicular to the placing surface, wherein the honeycomb structure is divided into two or more blocks in a direction perpendicular to both a moving direction of the pressing portions and a penetrating direction of the cells, and wherein the placing portion further includes a pair of supporting portions configured to support the honeycomb structure to sandwich the honeycomb structure, and the blocks and the supporting portions are bonded together by a linear adhesive portion parallel to the penetrating direction of the cells or an adhesive portion that has a shape of dots aligned in a direction parallel to the penetrating direction of the cells.

7. The battery manufacturing apparatus according to claim 2, wherein the plurality of cells are configured to be deformable as the pressing portions move.

8. The battery manufacturing apparatus according to claim 2, wherein
the honeycomb structure includes one or more of a paper, a metal sheet, a plastic sheet, and a laminate of two or more of the paper, the metal sheet or the plastic sheet.

9. The battery manufacturing apparatus according to claim 1, wherein
the placing portion includes a honeycomb structure, and
a plurality of cells penetrates the honeycomb structure in a raising and lowering direction of the placing portion.

10. The battery manufacturing apparatus according to claim 1, wherein
the placing portion includes a porous body having:
a placing surface on which the battery is placed; and
a plurality of cells partitioned from each other by partition walls, and
the plurality of cells penetrates the porous body in a direction perpendicular to the placing surface.

11. The battery manufacturing apparatus according to claim 1, wherein the pressing portions are configured to heat the battery.

12. The battery manufacturing apparatus according to claim 1, further comprising a charging device configured to charge the battery.

* * * * *